July 1, 1952  G. E. CARTER  2,601,834
LIQUID CONTROL DEVICE
Filed Dec. 1, 1949  2 SHEETS—SHEET 1

George E. Carter
INVENTOR.

July 1, 1952  G. E. CARTER  2,601,834
LIQUID CONTROL DEVICE
Filed Dec. 1, 1949  2 SHEETS—SHEET 2
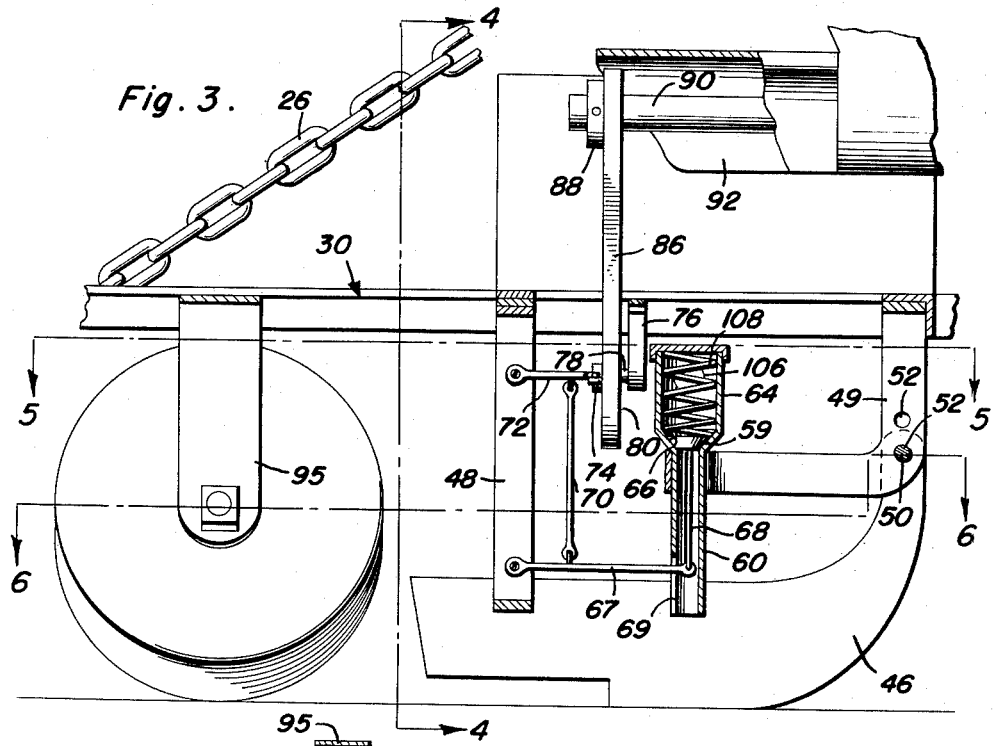
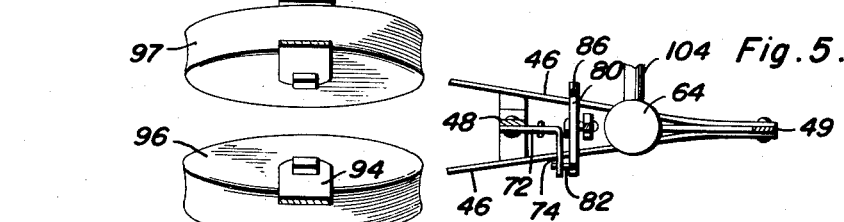
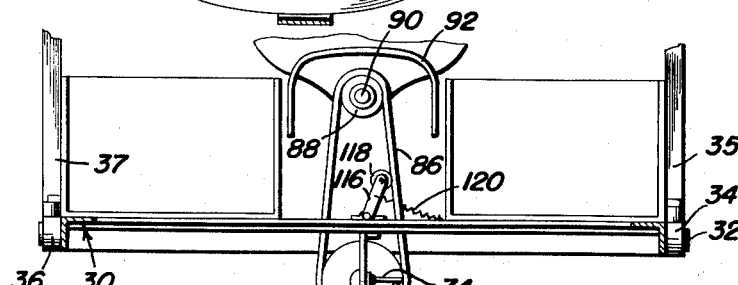
George E. Carter
INVENTOR.
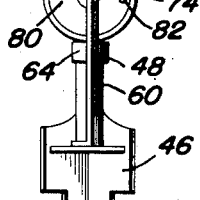

Patented July 1, 1952

2,601,834

UNITED STATES PATENT OFFICE 2,601,834

LIQUID CONTROL DEVICE

George E. Carter, Chase City, Va.

Application December 1, 1949, Serial No. 130,467

1 Claim. (Cl. 111—7)

This invention relates to novel and useful improvements in attachments for tractors, and more specifically relates to a planter device which deals with opening a furrow in the ground so that a plant may be manually disposed therein; supplying the necessary water in the furrow; and then closing the furrow.

An object of this invention is to open a furrow preferably by means of a sword carried by a frame drawn by a tractor, supplying a charge or quantity of water in the furrow in response to the amount of actuation of the tractor power take-off and then to close the furrow with the plant therein by means of a packing wheel assembly which is carried by the frame closely behind the sword.

Another object of this invention is to retain a supply of liquid on a tractor so that it is gravity-fed through an outlet member which has a valve therein, the valve being operated by means of a linkage which is actuated through the medium of a trip carried by the frame in such arrangement as to be operated in response to operation of the tractor power take-off; and the outlet member being so disposed with respect to the sword for opening a furrow that the water is supplied from the proper position or locale in the furrow.

A feature of the present invention is its adaptability for use in connection with various conventional tractors in such a manner that it may be swung pivotally to the inoperative position, thereby rendering the construction such that the tractor may be easily moved from one position to another.

Other objects and features will become apparent in following the description of the preferred form of the invention, illustrated in the accompanying drawings, wherein:

Figure 3 is an enlarged longitudinal sectional view taken substantially on the line 3—3 of Figure 1 and in the direction of the arrows;

Figure 4 is a sectional view illustrating detail of construction and taken substantially on the line 4—4 of Figure 3 and in the direction of the arrows;

Figure 5 is a sectional detail of construction taken on the line 5—5 of Figure 3 and in the direction of the arrows, illustrative particularly of the sword, outlet and wheel packing assembly.

Figure 1:
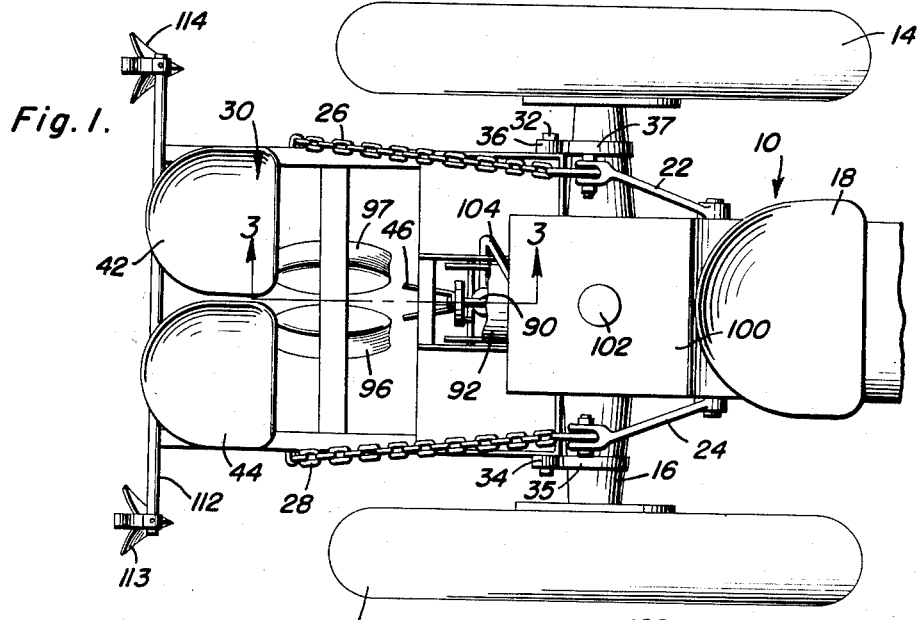
Figure 1 is a plan view of the preferred form of the invention showing the same attached to a part of a tractor.
Figure 2:
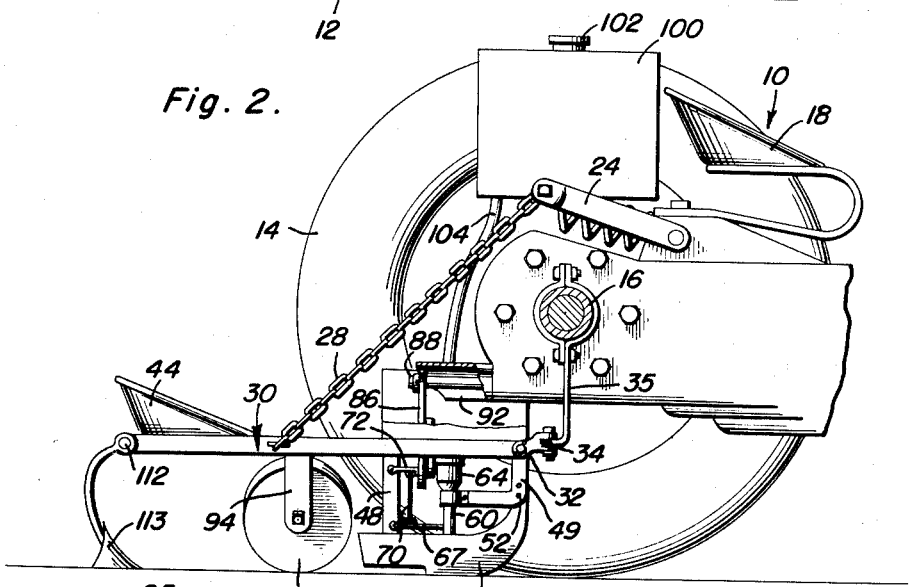
Figure 2 is a sectional view of the tractor and attachment shown in Figure 1.
Figure 6:
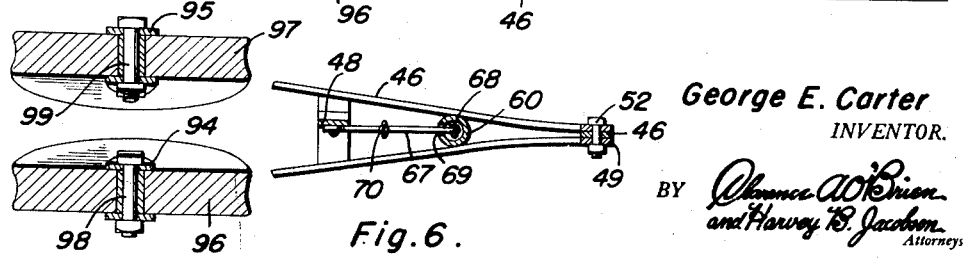
Figure 6 is a sectional view of the valve and outlet member taken substantially on the line 6—6 of Figure 3 and in the direction of the arrows.

In carrying out the invention, a form thereof is reduced to the structure of the drawings. By way of example, a commonly known tractor portion 10 is indicated with back wheels 12 and 14, respectively, as well as a rear axle housing 16, and seat 18. Hydraulically operative arms 22 and 24, respectively, are disclosed as a conventional part of the tractor and they have chains or other flexible members 26 and 28 fixed thereto.

A frame structure 30 is supplied with a pivot bar 32 at the forward end thereof and the bar has bosses 34 and 36 mounted thereon for pivotal movement. These bosses are pivoted to the hangers 35 and 37 which are secured to the axle housing 16, thereby mounting the frame 30 for pivotal movement. Chains 26 and 28 are fixed to the frame intermediate its front and rear ends and to the arms 22 and 24, so that upon operation of the arms 22 and 24, the frame, together with all of the structure which is fixed thereto, will be raised and lowered pivotally about the pivot bar 32.

Receptacles (unshown) are disposed on the frame adjacent the forward end thereof and may be simply rested thereon or fixed thereto, as by welding or bolting. Seats 42 and 44 are disposed at the rear end of the frame 30 for accommodation of persons to manually remove plants, saplings or the like from the receptacles and dispose them in a furrow which is opened by means of a sword 46.

The sword 46 is in itself conventional and has the lower end of a support 48 disposed therein adjacent the rear thereof. The front part of the sword is supported by a bracket 49 which has the pin 50 passed through one of the openings 52 in the bracket 49.

As the tractor is moved through a field, the sword opens a furrow to have the plants disposed therein, and a charge or supply of water is deposited in the open furrow. Means responsive to the actuation of the tractor power take-off is used for operating a valve member 59 to allow a charge of water to be discharged.

A vertical tube 60 is carried by the frame through the medium of the bracket 49 which is, in turn, secured to a suitable part of the frame 30. This tube has, adjacent its upper end, an enlargement 64 which forms a liquid chamber and has a tapered valve seat 66 therein for the valve member 59.

A valve operating rod 68 is secured to the valve member 59 and is secured to a link 67 which is passed through a slot 69 in the tube 60. A pitman 70 is secured to the link 67 intermediate the front end which is secured to the rod 68 and the rear end which is pivotally connected to the support 48. The upper end of the pitman is pivoted to a rocker 72. This rocker is pivotally connected to the support 48 at one end and has a laterally projecting member 74 at the other end.

Mounted for rotation by means of a suitable hanger 76 is a shaft 78 which has a pulley 80 thereon. This pulley has a finger 82 extending from one face thereof (Figure 4) which engages and operates the rocker 72 by striking the laterally projecting member 74 thereof.

A belt 86 is entrained around the pulley 80 and also around the pulley 88, which is secured to the power take-off shaft 90 of the tractor 10. A guard 92 is disposed over the power take-off shaft 90 and the pulley 88, said guard being secured to the tractor.

Mounting brackets 94 and 95 depend from the frame 30 and are disposed rearwardly of the sword 46. Packing wheels 96 and 97, respectively, are mounted for rotary movement by means of axles 98 and 99 which pass through the mounting brackets 95 and 96. The packing wheels are disposed at an angle so as to close the furrow which is opened by the sword, after the plant has been deposited therein.

A liquid tank 100 having a filler plug 102 in the opening at the top thereof is carried by the rear part of the tractor 10 appropriately. A hose 104 is connected with the bottom of the tank 100 and communicates with the inlet opening 106 of the valve chamber forming enlargement 64. Thus, liquid is gravity-fed from the tank 100 into the means of depositing a charge or quantity of water into the open furrow.

In operation, the tractor and power take-off are set into motion. As the power take-off operates, the pulley 80 is also caused to operate through the flexible connection including the belt 86, with the power take-off. When the pin 82 strikes the laterally projecting member 74, the pitman 70 is caused to be lifted, thereby lifting the valve 59 against the opposing force of the spring 108 which reacts on the cover for the liquid chamber and on the valve 59. This permits a charge or quantity of water to be deposited in the open furrow, which has been made by the sword 46, inasmuch as the tractor is now in forward motion in a field.

As the power take-off operates slightly more, the pin 82 passes the laterally projecting member 74, whereby the force of the spring 108 will return the valve to the closed condition. In the event that it is found more expedient to obviate the spring 108 and place a different spring in a different position, it is only necessary to remove the spring 108 and place another spring so that one end connects with the rocker 72 and the other end is secured firmly to a part of the frame. Other positions or places of connection of a similar spring may be arrived at.

While the tractor is moving through a field, the plow beam 112 having the plows 113 and 114 at the ends thereof causes plowing to be accomplished in the field. Therefore, two rows may be plowed while one row is being planted or set.

When it is desired to operate the device without using the liquid, by employing the conventional shift mechanism on a tractor, the power take-off may be rendered ineffectual. Moreover, when transporting the device, as from a barn, to the site or field, and for use at the ends of rows, the lift arms 22 and 24 are operated, causing the chains 26 and 28 to pivot the entire frame 30 about the pivot bar 32. At this time, the belt-tightening arm 116 with the tightener wheel 118 at the end thereof forces a portion of the belt 86 outwardly due to the action of the spring 120. This belt tightener prevents the belt 86 from becoming separated from its pertinent parts.

Having described the invention, what is claimed as new is:

In a liquid control device for a transplanter having a frame and a furrow opener, a support depending from said frame and connected to said furrow opener, a liquid conducting tube supported on said frame and having a discharge end disposed adjacent the furrow opener to conduct fluid into the open furrow, a normally closed valve within said tube, said valve having a vertically movable stem, a generally horizontal member pivoted at one end to said stem and pivoted at the other end to said support, a rocker disposed above said member substantially parallel thereto, said rocker having one end pivoted to said support and the other end free, a generally vertical pitman pivoted at its ends to said member and said rocker intermediate the ends of each, a pulley mounted on said frame for rotation about a horizontal axis, said pulley having a finger traveling in a circular path, and the free end of said rocker having a projection extending into the circular path of said finger; whereby rotation of the pulley periodically actuates the rocker and associated linkage for intermittent opening of the valve.

GEORGE E. CARTER.

REFERENCES CITED

The following references are of record in the file of this patent:

UNITED STATES PATENTS

| Number | Name | Date |
| --- | --- | --- |
| 653,298 | King | July 10, 1900 |
| 1,073,702 | Owens | Sept. 23, 1913 |
| 1,807,474 | England | May 26, 1931 |
| 2,506,430 | Melvin | May 2, 1950 |
| 2,559,183 | Barnett | July 3, 1951 |

FOREIGN PATENTS

| Number | Country | Date |
| --- | --- | --- |
| 421,729 | Great Britain | Dec. 28, 1934 |
| 514,840 | Great Britain | Nov. 26, 1939 |